US012711090B2

(12) United States Patent
Tao

(10) Patent No.: US 12,711,090 B2
(45) Date of Patent: Aug. 18, 2026

(54) PROCESSOR PLATFORM, CIRCUIT BOARD, AND SERVER

(71) Applicant: SUZHOU METABRAIN INTELLIGENT TECHNOLOGY CO., LTD., Suzhou (CN)

(72) Inventor: Shengying Tao, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 19/470,708

(22) PCT Filed: Jan. 21, 2025

(86) PCT No.: PCT/CN2025/073732

§ 371 (c)(1),
(2) Date: Sep. 29, 2025

(87) PCT Pub. No.: WO2025/157145

PCT Pub. Date: Jul. 31, 2025

(65) Prior Publication Data

US 2026/0119437 A1 Apr. 30, 2026

(30) Foreign Application Priority Data

Jan. 23, 2024 (CN) ......................... 202410092910.0

(51) Int. Cl.
*G06F 13/40* (2006.01)
*G06F 13/38* (2006.01)
*G06F 13/42* (2006.01)
*G06F 15/78* (2006.01)

(52) U.S. Cl.
CPC .. *G06F 13/4068* (2013.01); *G06F 2213/0026* (2013.01); *G06F 2213/0032* (2013.01); *G06F 2213/0042* (2013.01)

(58) Field of Classification Search
CPC ..................................... G06F 1/20; H05K 7/20
See application file for complete search history.

(56) References Cited

FOREIGN PATENT DOCUMENTS

| | | | |
|---|---|---|---|
| CN | 103149977 | A | 6/2013 |
| CN | 206696771 | U | 12/2017 |
| CN | 207232852 | U | 4/2018 |
| CN | 210324191 | U | 4/2020 |
| CN | 112860605 | A | 5/2021 |
| CN | 216210768 | U | 4/2022 |
| CN | 116225177 | A | 6/2023 |
| CN | 116501678 | A | 7/2023 |
| CN | 117632848 | A | 3/2024 |

*Primary Examiner* — Getente A Yimer
(74) *Attorney, Agent, or Firm* — IPro, PLLC

(57) ABSTRACT

A processor platform, a circuit board and a server, which relates to the technical field of computers. The processor platform includes one or more processors. Any one of the one or more processors has at least one ultra-path interconnecting port. The ultra-path interconnecting ports of different instances of the one or more processors correspond one to one. The ultra-path interconnecting ports of different instances of the one or more processors are connected correspondingly. The one or more processors include at least one port expanding processor, and the port expanding processor has an expansible data port.

18 Claims, 4 Drawing Sheets first connector
first first-connector port set
second first-connector port set
channe 10
channe 11
...
channe 17
channe 18
channe 19
...
channel 15
correspondingl y connected
correspondingly connected
channe 10
channe 11
...
channe 17
channe 18
channe 19
...
channel 15
first first-processor port set
second-processor port set
first processor
second connector

PROCESSOR PLATFORM, CIRCUIT BOARD, AND SERVER

CROSS-REFERENCE TO RELATED APPLICATION

The present application claims the priority of the Chinese patent application filed on Jan. 23, 2024 before the Chinese Patent Office with the application number of 202410092910.0 and the title of "PROCESSOR PLATFORM, CIRCUIT BOARD, AND SERVER", which is incorporated herein in its entirety by reference.

FIELD

The present application relates to the technical field of computers, and particularly relates to a processor platform, a circuit board and a server.

BACKGROUND

In the current Internet age, servers are the foundation of the information transmission, and drive the continuous development of the infrastructure. Moreover, the CPU (Central Processing Unit) is the calculating center of a server, and serves to process various complicated calculation and controlling instructions.

In order to improve the performance of the servers, in an aspect, usually, more than one CPUs are used to improve the computing performance of the servers, and the capacity of dealing with multi-task concurrent processing. In another aspect, the performance of a single CPU is being continuously iterated. Correspondingly, CPU products of a no-south-bridge architecture have emerged in the market, to improve the hardware IO (Input/Output) capacity of the CPUs, and add additional PCIe channels.

As compared with the original CPU products in which the PCIe (Peripheral Component Interconnect Express, a high-speed serial computer expansion-bus standard) ports are allocated fixedly, the PCIe ports are configured more flexibly. However, because the south-bridge architecture does not exist, the CPU cannot support the USB (Universal Serial Bus) signal transmission. Furthermore, the south-bridge module has a high cost. If, based on a no-south-bridge CPU product, the south-bridge module is additionally provided, undoubtedly that increases the overall cost of the server, and weakens the competitiveness of the product.

SUMMARY

The present application provides the following technical solutions:

- In an aspect, there is provided a processor platform, wherein the processor platform comprises one or more processors;
- any one of the one or more processors has at least one ultra-path interconnecting port;
- the ultra-path interconnecting ports of different instances of the one or more processors correspond one to one;
- the ultra-path interconnecting ports of different instances of the one or more processors are connected correspondingly; and
- the one or more processors include at least one port expanding processor, and the port expanding processor has an expansible data port.

Optionally, if the processor platform comprises at least two processors, the processor platform further comprises one or more expansible Open Computer Project (OCP) links.

Optionally, each of the one or more expansible OCP links comprises a first processor, a first connector and a second connector;

- the first connector has a first first-connector port set and a second first-connector port set, and the second connector has a second-connector port set;
- the first processor has a first first-processor port set;
- the first first-processor port set corresponds to the first first-connector port set;
- the ports in the first first-processor port set are connected correspondingly to the ports in the first first-connector port set; and
- the ports in the second first-connector port set are connected correspondingly to the ports in the second-connector port set.

Optionally, the processor platform further comprises a third connector, and the third connector has a third-connector port set;

- the first processor further has a second first-processor port set;
- the third-connector port set corresponds to the second-connector port set, and the second first-processor port set corresponds to the third-connector port set;
- the ports in the second-connector port set are connected correspondingly to the ports in the third-connector port set; and
- the ports in the third-connector port set are connected correspondingly to the ports in the second first-processor port set.

Optionally, the processor platform further comprises a second processor and a fourth connector;

- the second processor has a second second-processor port set;
- the fourth connector has a fourth-connector port set;
- the fourth-connector port set corresponds to the second-connector port set, and the second second-processor port set corresponds to the fourth-connector port set;
- the ports in the second-connector port set are connected correspondingly to the ports in the fourth-connector port set, to replace the ports in the second-connector port set to be connected correspondingly to the ports in the third-connector port set; and
- the ports in the fourth-connector port set are connected correspondingly to the ports in the second second-processor port set.

Optionally, the processor platform further comprises a complex programmable logic device;

- the complex programmable logic device has a first complex-programmable-logic-device port and a second complex-programmable-logic-device port;
- the second connector further has a first second-connector port and a second second-connector port;
- the first second-connector port is connected to the first complex-programmable-logic-device port, to indicate whether the second connector is connected to the third connector or the fourth connector; and
- the second second-connector port is connected to the second complex-programmable-logic-device port, to indicate that the second connector is connected to the third connector or that the second connector is connected to the fourth connector.

Optionally, the expansible data port has a plurality of Peripheral Component Interconnect Express (PCIe) channel pairs;

the PCIe channel pairs of a first quantity are connected to a corresponding port of a baseboard management controller;

the PCIe channel pairs of a second quantity are connected to a Universal Serial Bus (USB) interface; and the PCIe channel pairs of a third quantity are connected to a Serial Advanced Technology Attachment (SATA) interface.

Optionally, a link connecting the PCIe channel pairs of the second quantity and the USB interface comprises a USB controller; and the PCIe channel pairs of the second quantity are connected to the USB interface by the USB controller.

Optionally, the USB interface comprises at least one of an SCM USB interface and an MB USB interface.

Optionally, the USB interface is a USB2.0 interface and/or a USB3.0 interface.

Optionally, a link connecting the PCIe channel pairs of the third quantity and the SATA interface comprises an SATA converter; and the PCIe channel pairs of the third quantity are connected to the SATA interface by the SATA converter.

Optionally, the port expanding processor further comprises a plurality of first transmitting ports; and each of the first transmitting ports comprises 4 instances of the PCIe channel pairs.

Optionally, the port expanding processor further comprises at least one second transmitting port; and the second transmitting port comprises 8 instances of the PCIe channel pairs.

Optionally, the first second-connector port is configured for transmitting a position signal;

the second second-connector port is configured for transmitting a type signal;

the first complex-programmable-logic-device port is configured for receiving the position signal; and the second complex-programmable-logic-device port is configured for receiving the type signal.

Optionally, in response to the second connector being connected to the third connector or the fourth connector, the position signal is a low level; and in response to the third connector being connected to the second connector, the type signal is a high level.

Optionally, the port expanding processor is a processor that is not integrated with a south-bridge module.

Optionally, the ultra-path interconnecting ports are configured for transmitting communication data among the processors.

Optionally, the expansible OCP link has a single-port Single-Host x8 interface.

In another aspect, there is provided a circuit board, wherein the circuit board comprises the processor platform in the first aspect.

In yet another aspect, there is provided a server, wherein the server comprises the circuit board in the second aspect.

BRIEF DESCRIPTION OF THE DRAWINGS

In order to more clearly illustrate the technical solutions of the embodiments of the present application, the figures that are required to describe the embodiments will be briefly described below. Apparently, the figures that are described below are embodiments of the present application, and a person skilled in the art can obtain other figures according to these figures without paying creative work.

DETAILED DESCRIPTION

Figure 1:
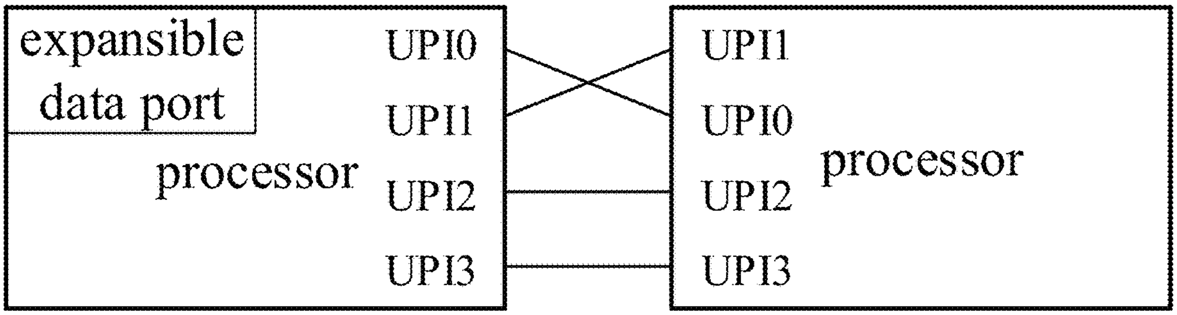
FIG. 1 is a schematic structural diagram of a processor platform according to an embodiment of the present application.

In order to make the objects, the technical solutions and the advantages of the present application clearer, the technical solutions according to the embodiments of the present application will be clearly and completely described below with reference to the drawings according to the embodiments of the present application. Apparently, the described embodiments are merely some of the embodiments of the present application, rather than all of the embodiments. All of the other embodiments that a person skilled in the art obtains on the basis of the embodiments of the present application without paying creative work fall within the protection scope of the present application.

Unless defined otherwise, the technical terminologies or scientific terminologies used in the present disclosure should have the meanings generally understood by a person skilled in the art of the present disclosure. The words used herein such as "first" and "second" do not indicate any sequence, quantity or priority, but are merely intended to distinguish different components. Likewise, the words such as "a", "an" or "the" do not indicate quantitative limitations, but indicate the existence of at least one instance. The serial numbers in the drawings of the description merely illustrate the distinguishing of the functional components or modules, and do not represent the logical relations of the components or modules. The words such as "comprise" or "include" mean that the element or article preceding the word encompasses the elements or articles and the equivalents thereof that are listed subsequent to the word, but do not exclude other elements or articles. The words such as "connect" or "couple" are not limited to physical or mechanical connections, but may include electric connections, regardless of direct connections or indirect connections. The words such as "upper", "lower", "left" and "right" are merely intended to indicate relative positions, and if the absolute position of the described item has changed, the relative positions might also be correspondingly changed.

The embodiments of the present disclosure will be described in detail below with reference to the drawings. It should be noted that, in the drawings, the same reference numbers are given to the components that basically have the same or similar structures and functions, and replicated description on them are omitted.

In order to solve the problem of the contradictory between the cost of the south-bridge module and the USB transmission function and the problem of the configuring of the high-performance PCIe ports when a no-south-bridge processor is used in the related art, the present application provides the following embodiments.

In some embodiments, as shown in FIG. 1, a processor platform, wherein the processor platform comprises one or more processors. Any one of the one or more processors has at least one ultra-path interconnecting port. The ultra-path interconnecting ports of different instances of the one or more processors correspond one to one. The ultra-path interconnecting ports of different instances of the one or more processors are connected correspondingly. The one or more processors include at least one port expanding processor, and the port expanding processor has an expansible data port.

In one or more embodiments, if the processor platform comprises at least two processors, the processor platform further comprises at least one expansible OCP link.

In one or more embodiments, each of the one or more expansible OCP links comprises a first processor, a first connector and a second connector. The first connector has a first first-connector port set and a second first-connector port set, and the second connector has a second-connector port set. The first processor has a first first-processor port set. The first first-processor port set corresponds to the first first-connector port set. The ports in the first first-processor port set are connected correspondingly to the ports in the first first-connector port set. The ports in the second-connector port set correspond to the second first-connector port set. The ports in the second first-connector port set are connected correspondingly to the ports in the second-connector port set.

In one or more embodiments, the processor platform further comprises a third connector, and the third connector has a third-connector port set. The first processor further has a second first-processor port set. The third-connector port set corresponds to the second-connector port set, and the second first-processor port set corresponds to the third-connector port set. The ports in the second-connector port set are connected correspondingly to the ports in the third-connector port set. The ports in the third-connector port set are connected correspondingly to the ports in the second first-processor port set.

In one or more embodiments, the processor platform further comprises a second processor and a fourth connector. The second processor has a second second-processor port set. The fourth connector has a fourth-connector port set. The fourth-connector port set corresponds to the second-connector port set, and the second second-processor port set corresponds to the fourth-connector port set. The ports in the second-connector port set are connected correspondingly to the ports in the fourth-connector port set, to replace the ports in the second-connector port set to be connected correspondingly to the ports in the third-connector port set. The ports in the fourth-connector port set are connected correspondingly to the ports in the second second-processor port set.

In one or more embodiments, the processor platform further comprises a complex programmable logic device. The complex programmable logic device has a first complex-programmable-logic-device port and a second complex-programmable-logic-device port. The second connector further has a first second-connector port and a second second-connector port. The first second-connector port is connected to the first complex-programmable-logic-device port, to indicate whether the second connector is connected to the third connector or the fourth connector. The second second-connector port is connected to the second complex-programmable-logic-device port, to indicate that the second connector is connected to the third connector or that the second connector is connected to the fourth connector.

The ultra-path interconnecting ports (Ultra-Path Interconnect, UPI) are configured for transmitting communication data among the processors. As shown in FIG. 1, a processor platform formed by two processors is taken as an example. One of the processors comprises ultra-path interconnecting ports UPI0, UPI1, UPI2 and UPI3. The other processor comprises ultra-path interconnecting ports UPI0, UPI1, UPI2 and UPI3. The corresponding ultra-path interconnecting ports of the two processors are interconnected. In the processor platform, the two processors can transmit data therebetween.

Figure 2:
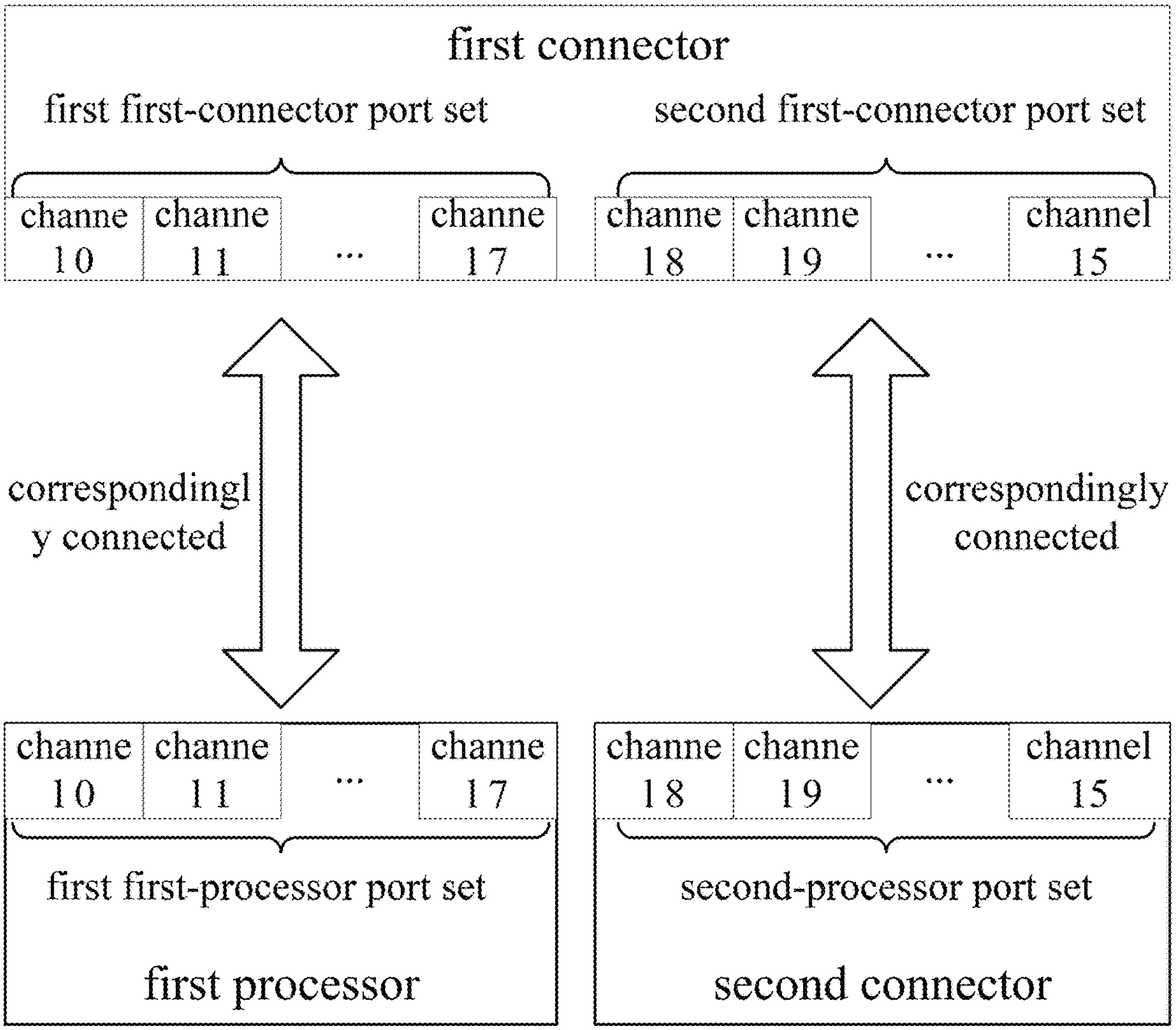
FIG. 2 is a schematic structural diagram of an expansible OCP link formed by two processors according to an embodiment of the present application.

The processor platform shown in FIG. 2 comprises one expansible OCP link. Each of the expansible OCP link comprises a first processor, a first connector and a second connector. The first connector has a first first-connector port set and a second first-connector port set, and the second connector has a second-connector port set.

The first first-connector port set comprises channels whose serial numbers are 0, 1, . . . and 7. The second first-connector port set comprises channels whose serial numbers are 8, 9, . . . and 15. The first processor has a first first-processor port set, which comprises channels whose serial numbers are 0, 1, . . . and 7, which correspond to the channels whose serial numbers are 0, 1, . . . and 7 in the first first-connector port set. Correspondingly, the ports of the channels whose serial numbers are 0, 1, . . . and 7 in the first first-processor port set are connected correspondingly to the ports of the channels whose serial numbers are 0, 1, . . . and 7 in the first first-connector port set. The ports in the second-connector port set correspond to the second first-connector port set, which comprises channels whose serial numbers are 8, 9, . . . and 15. Correspondingly, the ports of the channels whose serial numbers are 8, 9, . . . and 15 in the second-connector port set are connected correspondingly to the ports of the channels whose serial numbers are 8, 9, . . . and 15 in the second first-connector port set.

The expansible OCP link obtained in the above connection mode has a Single-Host x8 interface. One of the processors processes the data transmitted via the first first-connector port set.

In one or more embodiments, the processor platform further comprises a third connector, the third connector has a third-connector port set, and the third-connector port set comprises channels whose serial numbers are 8, 9, . . . and 15. The first processor further has a second first-processor port set, which comprises channels whose serial numbers are 8, 9, . . . and 15. The third-connector port set corresponds to the second-connector port set, and the second first-processor port set corresponds to the third-connector port set. The ports of the channels whose serial numbers are 8, 9, . . . and 15 in the second-connector port set are connected to the ports of the channels whose serial numbers are 8, 9, . . . and 15 in the third-connector port set, as the connection path A shown in FIG. 3.

Figure 3:
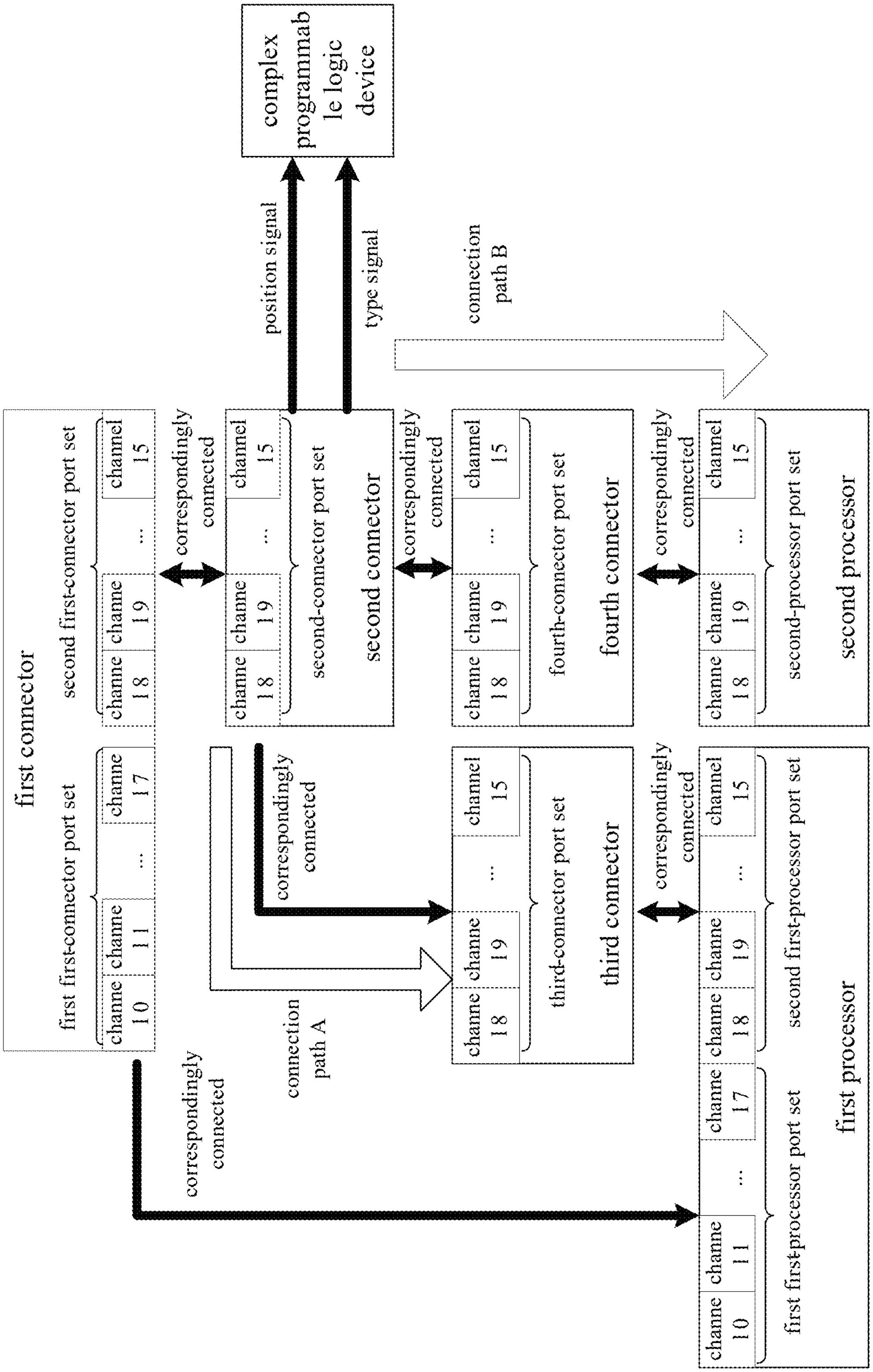
FIG. 3 is a schematic diagram of a connection path of an expansible OCP link according to an embodiment of the present application.

The expansible OCP link obtained by the connection by using the connection path A shown in FIG. 3 has a Single-Host x16 interface. In the interface, one of the processors processes the data transmitted via the first first-connector port set and the second first-connector port set.

In one or more embodiments, the processor platform further comprises a second processor and a fourth connector. The second processor has a second second-processor port set, which comprises ports of channels whose serial numbers are 8, 9, . . . and 15. The fourth connector has a fourth-connector port set, which comprises ports of channels whose serial numbers are 8, 9, . . . and 15. The ports of the channels whose serial numbers are 8, 9, . . . and 15 in the fourth-connector port set correspond to the ports of the channels whose serial numbers are 8, 9, . . . and 15 in the second-connector port set, and the ports of the channels whose serial numbers are 8, 9, . . . and 15 in the second second-processor port set correspond to the ports of the channels whose serial numbers are 8, 9, . . . and 15 in the fourth-connector port set. The ports of the channels whose serial numbers are 8, 9, . . . and 15 in the second-connector port set are connected correspondingly to the ports of the channels whose serial numbers are 8, 9, . . . and 15 in the fourth-connector port set, to replace the ports of the channels whose serial numbers are 8, 9, . . . and 15 in the second-connector port set to be connected correspondingly to the ports of the channels whose serial numbers are 8, 9, . . . and 15 in the third-connector port set. That is as the connection path B shown in FIG. 3.

The expansible OCP link obtained by the connection by using the connection path B shown in FIG. 3 has a Multi-Host x16 interface. Because two processors are used, which separately process the data transmitted via the first first-connector port set and the second first-connector port set, the link that is connected in such a mode has a higher data-processing efficiency.

The ports of the channels whose serial numbers are 8, 9, . . . and 15 in the fourth-connector port set are connected correspondingly to the ports of the channels whose serial numbers are 8, 9, . . . and 15 in the second second-processor port set.

In one or more embodiments, the processor platform further comprises a complex programmable logic device (CPLD), as shown in FIG. 3.

The complex programmable logic device has a first complex-programmable-logic-device port configured for receiving a position signal, and a second complex-programmable-logic-device port configured for receiving a type signal. The second connector further has a first second-connector port configured for transmitting a position signal, and a second second-connector port configured for transmitting a type signal. The first second-connector port is connected to the first complex-programmable-logic-device port, to indicate whether the second connector is connected to the third connector or the fourth connector. The second second-connector port is connected to the second complex-programmable-logic-device port, to, if the second connector is connected to the third connector or the fourth connector, indicate whether the second connector is connected to the third connector or the fourth connector.

In an embodiment, CABLE_PRSNT is a position signal, and CPU_ADDR is a type signal. If the second connector is connected to the third connector or the fourth connector, the CABLE_PRSNT signal is a low level (the CABLE_PRSNT signal is a high level by default). If the third connector is connected to the second connector, the CPU_ADDR signal is a high level (the CPU_ADDR signal is a low level by default). By using the electrical-level indication of the position signal and the type signal, the bandwidth allocation of the expansible OCP link may be known.

In some other embodiments, the expansible data port has a plurality of PCIe channel pairs. The PCIe channel pairs of a first quantity are connected to a corresponding port of a baseboard management controller. The PCIe channel pairs of a second quantity are connected to a USB interface. The PCIe channel pairs of a third quantity are connected to an SATA interface.

In one or more embodiments, a link connecting the PCIe channel pairs of the second quantity and the USB interface comprises a USB controller. The PCIe channel pairs of the second quantity are connected to the USB interface by the USB controller.

In one or more embodiments, the USB interface comprises at least one of an SCM USB interface and an MB USB interface.

In one or more embodiments, the USB interface is a USB2.0 interface and/or a USB3.0 interface.

In one or more embodiments, a link connecting the PCIe channel pairs of the third quantity and the SATA interface comprises an SATA converter. The PCIe channel pairs of the third quantity are connected to the SATA interface by the SATA converter.

In one or more embodiments, the port expanding processor further comprises a plurality of first transmitting ports. Each of the first transmitting ports comprises 4 PCIe channel pairs.

In one or more embodiments, the port expanding processor further comprises at least one second transmitting port. The second transmitting port comprises 8 PCIe channel pairs.

In the embodiments of the present application, the port expanding processor refers to a processor that is not integrated with a south-bridge module. Usually, the south-bridge module has an SATA (Serial ATA) port configured for connecting a magnetic disk or disk array. The south-bridge module has a USB data-transmission port configured for supporting data to be transmitted via a USB3.0 or USB2.0 interface. The south-bridge module has a straightly connecting port to a BMC (Baseboard Management Controller), to perform data interaction with the BMC, so as to, usually, transmit the data corresponding to the contents displayed by the BMC. The omission of the south-bridge module from the processor means that the capacity of the data interaction of the processor with peripheral storage mediums is reduced, as a cost of the improvement in the hardware IO performance of the processor. Furthermore, a group of PCIe ports is added as the processor function expansion, which may increase the efficiency of the data interaction between the processor and peripheral devices, thereby improving the performance of the processor. A typical representative of the processor according to the present application is the processor employed by the Birch Stream platform. In the latest generation of the Birch Stream platform, the south-bridge module is omitted from the architecture of the processor platform. Correspondingly, a hardware IO module is added into the processor, and a group of PCIe ports is added, for the function expansion.

In the expansible data port of the port expanding processor, the newly added group of PCIe ports, after the expansion, may realize the data interaction with the SATA hard-disk interface, the USB interface and the BMC.

By connecting the PCIe channel pairs of the first quantity with the corresponding PCIe ports in the BMC, the data transmission between the CPU and the BMC may be realized. 1 PCIe channel pair comprises 2 PCIe channels. Usually, the first quantity is 1. In other words, 1 PCIe channel pair is used to be connected to the corresponding PCIe port in the BMC.

By connecting the PCIe channel pairs of the second quantity with the USB interface via the USB controller, a data transmission interface may be provided to the USB device, to realize the data transmission between the processor and the USB device. Usually, the second quantity is 2.

In other words, 2 PCIe channel pairs are used to be connected to the USB interface via the USB controller.

In one or more embodiments, the signal of the USB controller is Renesas UPD720201.

In one or more embodiments, each of the two PCIe channel pairs is connected to the USB interface by one Renesas UPD720201 module. Each of the Renesas UPD720201 modules may be converted into 4 USB interfaces. Furthermore, each of the USB interfaces supports the USB2.0 or USB3.0 protocol. Optionally, the USB interfaces obtained by the conversion by the Renesas UPD720201 modules are provided at the front window and/or the rear window of the complete machine. The USB3.0 interfaces obtained by the conversion are usually used to be connected to an externally connected device for the data transmission. Optionally, they may also be connected to a card controller to be converted to a TF-card interface, for the transmission of SDIO signals. The USB2.0 interfaces obtained by the conversion are usually connected to the BMC, for KVM (Keyboard Video Mouse) information interaction.

In the above manner, when the Birch Stream platform does not have the south-bridge module, the transmission of the USB signals is realized.

By connecting the PCIe channel pairs of the third quantity with the SATA interface via the SATA converter, a data transmission interface may be provided to the SATA hard disk, to realize the data transmission between the processor and the SATA hard disk. Usually, the third quantity is 1. In other words, 1 PCIe channel pair is used to be connected to the SATA interface via the SATA converter.

In one or more embodiments, the SATA converter is ASM1062R. The SATA interface converted from the PCIe channel pair by the ASM1062R module supports the function of an RAID1 disk array (Redundant Arrays of Independent Disks). When the Birch Stream platform does not have the south-bridge module, the data transmission with the SATA hard disk or the RAID1 disk array is realized.

Figure 4:
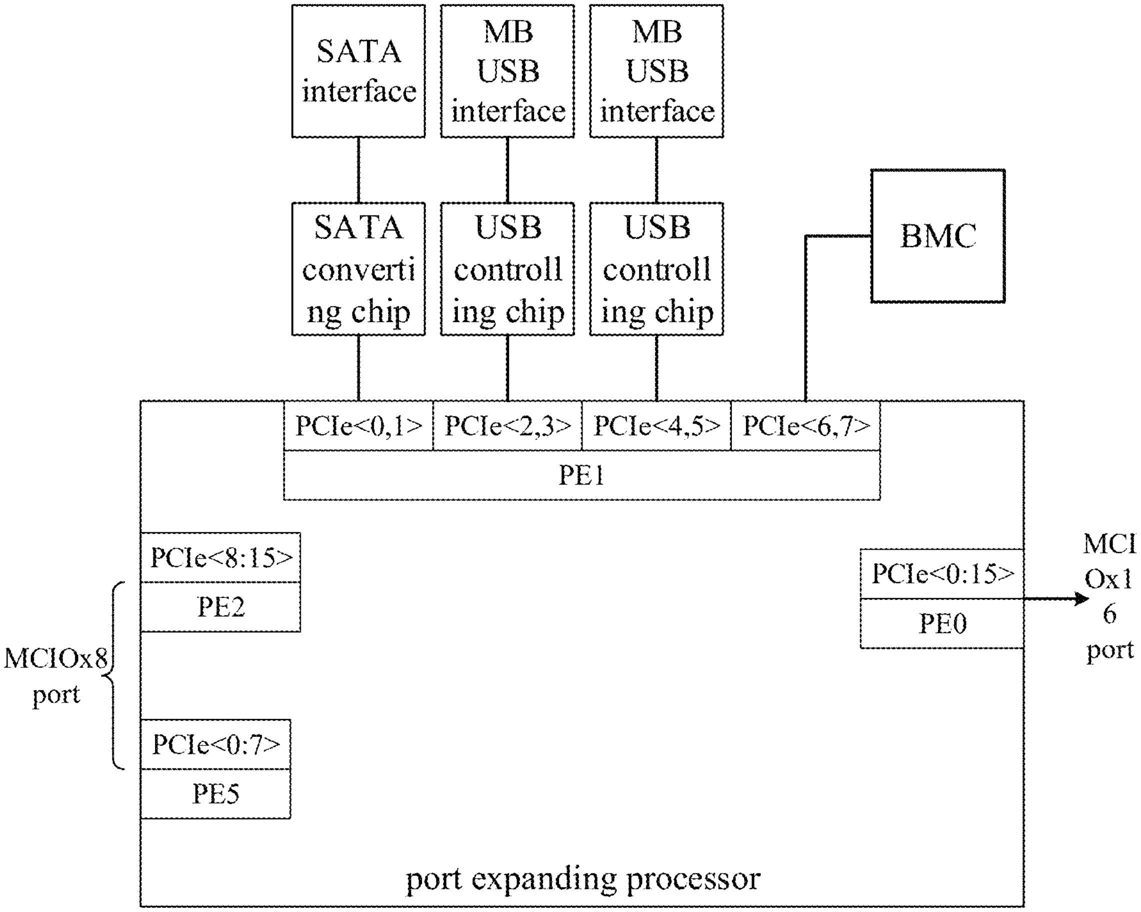
FIG. 4 is a schematic structural diagram of a port expanding processor according to an embodiment of the present application.
Figure 5:
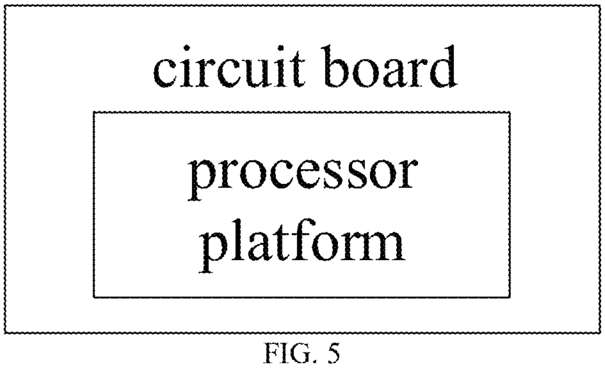
FIG. 5 is a schematic structural diagram of a circuit board according to an embodiment of the present application.
Figure 6:
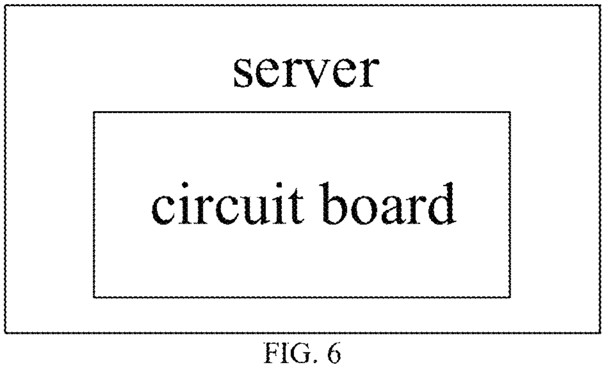
FIG. 6 is a schematic structural diagram of a server according to an embodiment of the present application.

As an embodiment, as shown in FIG. 4, the added group of PCIe ports are configured to be a PE1 interface, which comprises 8 PCIe channels PCIe<0:7>. A channel 0 and a channel 1 form one PCIe channel pair, a channel 2 and a channel 3 form one PCIe channel pair, a channel 4 and a channel 5 form one PCIe channel pair, and a channel 6 and a channel 7 form one PCIe channel pair.

The PCIe channel pair formed by the channel 0 and the channel 1 is connected to the corresponding PCIe port in the BMC via the mainboard, to realize the data interaction between the processor and the BMC, so as to transmit the data corresponding to the contents displayed by the BMC. The PCIe channel pair formed by the channel 2 and the channel 3 is connected to a USB interface by a Renesas UPD720201 module, wherein the USB interface is an MB USB interface. The PCIe channel pair formed by the channel 4 and the channel 5 is connected to a USB interface by a Renesas UPD720201 module, wherein the USB interface is an SCM USB interface. The PCIe channel pair formed by the channel 6 and the channel 7 is connected to a SATA interface by an ASM1062R module, to be connected to an SATA hard disk or an RAID1 disk array.

As shown in FIG. 4, the port expanding processor further comprises a plurality of first transmitting ports. The first transmitting ports are MCIOx8 ports. Each of the first transmitting ports comprises 4 PCIe channel pairs.

As an embodiment, the first transmitting port (MCIOx8 port) in the PE2 interface in FIG. 4 comprises a channel 8, a channel 9, . . . and a channel 15. The first transmitting port (MCIOx8 port) in the PE5 interface comprises a channel 0, a channel 1, . . . and a channel 7. That realizes the flexible configuring of the MCIOx8 ports. Similarly, the other first transmitting ports and the channel pairs comprised by the other first transmitting ports will not be described one by one.

As shown in FIG. 4, the port expanding processor further comprises at least one second transmitting port. The second transmitting port is an MCIOx16 port. Each of the second transmitting port comprises 8 PCIe channel pairs. That realizes the flexible configuring of the high-performance MCIOx16 port.

As an embodiment, the second transmitting port (MCIOx16 port) in the PE0 interface in FIG. 4 comprises a channel 0, a channel 1, . . . and a channel 15.

In some other embodiments, there is provided a circuit board, wherein the circuit board comprises a processor platform, wherein the processor platform comprises one or more processors. Any one of the one or more processors has at least one ultra-path interconnecting port. The ultra-path interconnecting ports of different instances of the one or more processors correspond one to one. The ultra-path interconnecting ports of different instances of the one or more processors are connected correspondingly. The one or more processors include at least one port expanding processor, and the port expanding processor has an expansible data port.

In one or more embodiments, if the processor platform comprises at least two processors, the processor platform further comprises at least one expansible OCP link.

In one or more embodiments, each of the one or more expansible OCP links comprises a first processor, a first connector and a second connector. The first connector has a first first-connector port set and a second first-connector port set, and the second connector has a second-connector port set. The first processor has a first first-processor port set. The first first-processor port set corresponds to the first first-connector port set. The ports in the first first-processor port set are connected correspondingly to the ports in the first first-connector port set. The ports in the second-connector port set correspond to the second first-connector port set. The ports in the second first-connector port set are connected correspondingly to the ports in the second-connector port set.

In one or more embodiments, the processor platform further comprises a third connector, and the third connector has a third-connector port set. The first processor further has a second first-processor port set. The third-connector port set corresponds to the second-connector port set, and the second first-processor port set corresponds to the third-connector port set. The ports in the second-connector port set are connected correspondingly to the ports in the third-connector port set. The ports in the third-connector port set are connected correspondingly to the ports in the second first-processor port set.

In one or more embodiments, the processor platform further comprises a second processor and a fourth connector. The second processor has a second second-processor port set. The fourth connector has a fourth-connector port set. The fourth-connector port set corresponds to the second-connector port set, and the second second-processor port set corresponds to the fourth-connector port set. The ports in the second-connector port set are connected correspondingly to the ports in the fourth-connector port set, to replace the ports in the second-connector port set to be connected correspondingly to the ports in the third-connector port set. The ports in the fourth-connector port set are connected correspondingly to the ports in the second second-processor port set.

In one or more embodiments, the processor platform further comprises a complex programmable logic device. The complex programmable logic device has a first complex-programmable-logic-device port and a second complex-programmable-logic-device port. The second connector further has a first second-connector port and a second second-connector port. The first second-connector port is connected to the first complex-programmable-logic-device port, to indicate whether the second connector is connected to the third connector or the fourth connector. The second second-connector port is connected to the second complex-programmable-logic-device port, to indicate that the second connector is connected to the third connector or that the second connector is connected to the fourth connector.

The expansible data port has a plurality of PCIe channel pairs. The PCIe channel pairs of a first quantity are connected to a corresponding port of a baseboard management controller. The PCIe channel pairs of a second quantity are connected to a USB interface. The PCIe channel pairs of a third quantity are connected to an SATA interface.

In one or more embodiments, a link connecting the PCIe channel pairs of the second quantity and the USB interface comprises a USB controller. The PCIe channel pairs of the second quantity are connected to the USB interface by the USB controller.

In one or more embodiments, the USB interface comprises at least one of an SCM USB interface and an MB USB interface.

In one or more embodiments, the USB interface is a USB2.0 interface and/or a USB3.0 interface.

In one or more embodiments, a link connecting the PCIe channel pairs of the third quantity and the SATA interface comprises an SATA converter.

the PCIe channel pairs of the third quantity are connected to the SATA interface by the SATA converter.

In one or more embodiments, the port expanding processor further comprises a plurality of first transmitting ports. Each of the first transmitting ports comprises 4 PCIe channel pairs.

In one or more embodiments, the port expanding processor further comprises at least one second transmitting port. The second transmitting port comprises 8 PCIe channel pairs.

In some other embodiments, there is provided a computer, wherein the computer comprises a circuit board, wherein the circuit board comprises a processor platform, wherein the processor platform comprises one or more processors. Any one of the one or more processors has at least one ultra-path interconnecting port. The ultra-path interconnecting ports of different instances of the one or more processors correspond one to one. The ultra-path interconnecting ports of different instances of the one or more processors are connected correspondingly. The one or more processors include at least one port expanding processor, and the port expanding processor has an expansible data port.

In one or more embodiments, if the processor platform comprises at least two processors, the processor platform further comprises at least one expansible OCP link.

In one or more embodiments, each of the one or more expansible OCP links comprises a first processor, a first connector and a second connector. The first connector has a first first-connector port set and a second first-connector port set, and the second connector has a second-connector port set. The first processor has a first first-processor port set. The first first-processor port set corresponds to the first first-connector port set. The ports in the first first-processor port set are connected correspondingly to the ports in the first first-connector port set. The ports in the second-connector port set correspond to the second first-connector port set. The ports in the second first-connector port set are connected correspondingly to the ports in the second-connector port set.

In one or more embodiments, the processor platform further comprises a third connector, and the third connector has a third-connector port set. The first processor further has a second first-processor port set. The third-connector port set corresponds to the second-connector port set, and the second first-processor port set corresponds to the third-connector port set. The ports in the second-connector port set are connected correspondingly to the ports in the third-connector port set. The ports in the third-connector port set are connected correspondingly to the ports in the second first-processor port set.

In one or more embodiments, the processor platform further comprises a second processor and a fourth connector. The second processor has a second second-processor port set. The fourth connector has a fourth-connector port set. The fourth-connector port set corresponds to the second-connector port set, and the second second-processor port set corresponds to the fourth-connector port set. The ports in the second-connector port set are connected correspondingly to the ports in the fourth-connector port set, to replace the ports in the second-connector port set to be connected correspondingly to the ports in the third-connector port set. The ports in the fourth-connector port set are connected correspondingly to the ports in the second second-processor port set.

In one or more embodiments, the processor platform further comprises a complex programmable logic device. The complex programmable logic device has a first complex-programmable-logic-device port and a second complex-programmable-logic-device port. The second connector further has a first second-connector port and a second second-connector port. The first second-connector port is connected to the first complex-programmable-logic-device port, to indicate whether the second connector is connected to the third connector or the fourth connector. The second second-connector port is connected to the second complex-programmable-logic-device port, to indicate that the second connector is connected to the third connector or that the second connector is connected to the fourth connector.

The expansible data port has a plurality of PCIe channel pairs. The PCIe channel pairs of a first quantity are connected to a corresponding port of a baseboard management controller. The PCIe channel pairs of a second quantity are connected to a USB interface. The PCIe channel pairs of a third quantity are connected to an SATA interface.

In one or more embodiments, a link connecting the PCIe channel pairs of the second quantity and the USB interface comprises a USB controller. The PCIe channel pairs of the second quantity are connected to the USB interface by the USB controller.

In one or more embodiments, the USB interface comprises at least one of an SCM USB interface and an MB USB interface.

In one or more embodiments, the USB interface is a USB2.0 interface and/or a USB3.0 interface.

In one or more embodiments, a link connecting the PCIe channel pairs of the third quantity and the SATA interface comprises an SATA converter. The PCIe channel pairs of the third quantity are connected to the SATA interface by the SATA converter.

In one or more embodiments, the port expanding processor further comprises a plurality of first transmitting ports. Each of the first transmitting ports comprises 4 PCIe channel pairs.

In one or more embodiments, the port expanding processor further comprises at least one second transmitting port. The second transmitting port comprises 8 PCIe channel pairs.

By implementing the processor platform, the circuit board and the server according to the embodiments of the present application, as shown in FIGS. 1-5, the function of USB data transmission may be realized without a south-bridge module. The south-bridge module is not required, which reduces the cost of the complete machine. The flexible configuring of the PCIe ports is realized, and a high-performance Multi-Host PCIe x16 port is realized.

All of the above-described technical solutions may be combined randomly to form the embodiments of the present application, which are not discussed further herein.

A processor platform, as shown in FIG. 1, the processor platform comprises one or more processors. Any one of the one or more processors has at least one ultra-path interconnecting port. The ultra-path interconnecting ports of different instances of the one or more processors correspond one to one.

the ultra-path interconnecting ports of different instances of the one or more processors are connected correspondingly.

the one or more processors include at least one port expanding processor, and the port expanding processor has an expansible data port.

In one or more embodiments, if the processor platform comprises at least two processors, the processor platform further comprises at least one expansible OCP link.

In one or more embodiments, each of the one or more expansible OCP links comprises a first processor, a first connector and a second connector. The first connector has a first first-connector port set and a second first-connector port set, and the second connector has a second-connector port set. The first processor has a first first-processor port set. The first first-processor port set corresponds to the first first-connector port set. The ports in the first first-processor port set are connected correspondingly to the ports in the first first-connector port set. The ports in the second-connector port set correspond to the second first-connector port set. The ports in the second first-connector port set are connected correspondingly to the ports in the second-connector port set.

In one or more embodiments, the processor platform further comprises a third connector, and the third connector has a third-connector port set. The first processor further has a second first-processor port set. The third-connector port set corresponds to the second-connector port set, and the second first-processor port set corresponds to the third-connector port set. The ports in the second-connector port set are connected correspondingly to the ports in the third-connector port set. The ports in the third-connector port set are connected correspondingly to the ports in the second first-processor port set.

In one or more embodiments, the processor platform further comprises a second processor and a fourth connector. The second processor has a second second-processor port set. The fourth connector has a fourth-connector port set. The fourth-connector port set corresponds to the second-connector port set, and the second second-processor port set corresponds to the fourth-connector port set. The ports in the second-connector port set are connected correspondingly to the ports in the fourth-connector port set, to replace the ports in the second-connector port set to be connected correspondingly to the ports in the third-connector port set. The ports in the fourth-connector port set are connected correspondingly to the ports in the second second-processor port set.

In one or more embodiments, the processor platform further comprises a complex programmable logic device. The complex programmable logic device has a first complex-programmable-logic-device port and a second complex-programmable-logic-device port. The second connector further has a first second-connector port and a second second-connector port. The first second-connector port is connected to the first complex-programmable-logic-device port, to indicate whether the second connector is connected to the third connector or the fourth connector. The second second-connector port is connected to the second complex-programmable-logic-device port, to indicate that the second connector is connected to the third connector or that the second connector is connected to the fourth connector.

In one or more embodiments, the expansible data port has a plurality of PCIe channel pairs. The PCIe channel pairs of a first quantity are connected to a corresponding port of a baseboard management controller. The PCIe channel pairs of a second quantity are connected to a USB interface. The PCIe channel pairs of a third quantity are connected to an SATA interface.

In one or more embodiments, a link connecting the PCIe channel pairs of the second quantity and the USB interface comprises a USB controller. The PCIe channel pairs of the second quantity are connected to the USB interface by the USB controller.

In one or more embodiments, the USB interface comprises at least one of an SCM USB interface and an MB USB interface.

In one or more embodiments, the USB interface is a USB2.0 interface and/or a USB3.0 interface.

In one or more embodiments, a link connecting the PCIe channel pairs of the third quantity and the SATA interface comprises an SATA converter. The PCIe channel pairs of the third quantity are connected to the SATA interface by the SATA converter.

In one or more embodiments, the port expanding processor further comprises a plurality of first transmitting ports. Each of the first transmitting ports comprises 4 PCIe channel pairs.

In one or more embodiments, the port expanding processor further comprises at least one second transmitting port. The second transmitting port comprises 8 PCIe channel pairs.

A circuit board, wherein the circuit board comprises the processor platform stated above. The processor platform has already been described in detail above, and is not discussed further herein.

A computer, wherein the computer comprises the circuit board stated above. The circuit board has already been described above, and is not discussed further herein.

Particularly, according to the embodiments of the present application, the process illustrated above with reference to the flow chart may be implemented as a computer software program. For example, an embodiment of the present application provides a computer program product, the computer program product comprises a computer program loaded in a computer-readable medium, and the computer program contains a program code for implementing the method shown in the flow chart. In the embodiment, the computer program may be downloaded and installed from a network by a communicating device, or installed from a memory, or installed from an ROM. The computer program, when executed by an external processor, implements the above-described functions defined in the method according to the embodiments of the present application.

It should be noted that the computer-readable medium according to the embodiments of the present application may be a computer-readable signal medium or a computer-readable storage medium or any combination thereof. The computer-readable storage medium may be a non-transient computer-readable storage medium. The computer-readable storage medium may, for example, be, but is not limited to, an electric, magnetic, optical, electromagnetic, infrared or semiconductor system, apparatus or device, or any combination thereof. The computer-readable storage medium may include but is not limited to an electric connection having one or more leads, a portable computer magnetic disk, a hard disk, a Random Access Memory (RAM), a Read-Only Memory (ROM), an Erasable Programmable Read-Only Memory or flash memory, an optical fiber, a portable Compact Disc Read-Only Memory (CD-ROM), a light storage device and a magnetic storage device, or any suitable combination thereof. In the embodiments of the present application, the computer-readable storage medium may be any tangible medium containing or storing a program, and the program may be used by or used with an instruction executing system, apparatus or device. Moreover, in the embodiments of the present application, the computer-readable signal medium may include a data signal transmitted in a baseband or as part of a carrier wave, which carries a computer-readable program code. Such a transmitted data signal may be in various forms, including but not limited to an electromagnetic signal, an optical signal or any suitable combination thereof. The computer-readable signal medium may also be any other computer-readable medium than the computer-readable storage medium, and the computer-readable signal medium may emit, propagate or transmit a program used by or used with an instruction executing system, apparatus or device. The program code contained in the computer-readable medium may be transmitted by using any suitable medium, including but not limited to an electric wire, an fiber optic cable, RF (Radio Frequency) and so on, or any suitable combination thereof.

The computer-readable medium may be comprised by the server, and may also exist separately and not be installed in the server. The computer-readable medium carries one or more programs, and the one or more programs, when executed by the server, cause the server to, in response to it having been detected that the peripheral mode of the terminal is not activated, acquire the frame rate of the application in the terminal; in response to it having been determined that the frame rate satisfies the screen-shutdown condition, determine whether the user is acquiring the screen information of the terminal; and, in response to that the determination result is that the user is not acquiring the screen information of the terminal, control the screen to enter the immediately darkening mode.

One or more programming languages or a combination thereof may be used to write the computer program code for implementing the operations of the embodiments of the present application. The programming languages include object-oriented programming languages such as Java, Smalltalk and C++, and further include common procedural programming languages such as C programming language or similar programming languages. The program code may be executed fully in the user computer, executed partially in the user computer, executed as an independent software package, executed partially in the user computer and partially in a remote computer, or executed fully in a remote computer or server. In the scenes involving a remote computer, the remote computer may be connected to the user computer via a network of any type, including a Local Area Network (LAN) or a Wide Area Network (WAN), or may be connected to an external computer (For example, connected via the Internet by using an Internet Service Provider).

The embodiments of the description are described in the mode of progression, the same or similar parts of the embodiments may refer to each other, and each of the embodiments emphatically describes the differences from the other embodiments. Especially, regarding the systems or the system embodiments, because they are substantially similar to the process embodiments, they are described simply, and the related parts may refer to the description on the process embodiments. The above-described systems and system embodiments are merely illustrative, wherein the units that are described as separate components may or may not be physically separate, and the components that are displayed as units may or may not be physical units; in other words, they may be located at the same one location, and may also be distributed to a plurality of network units. Some or all of the modules may be selected according to practical demands to realize the purposes of the solutions of the embodiments. A person skilled in the art can understand and implement the technical solution without paying creative work.

The technical solutions of the present application have been described in detail above. The principle and the embodiments of the present application are described herein with reference to the particular examples, and the description of the above embodiments is merely intended to facilitate to comprehend the method according to the present application and its core concept. Moreover, for a person skilled in the art, according to the concept of the present application, the particular embodiments and the range of application may be varied. In conclusion, the contents of the description should not be comprehended as limiting the present application.

The above description is merely preferable embodiments of the present application, and is not intended to limit the present application. Any modifications, equivalent substitutions and improvements that are made within the spirit and the principle of the present application should fall within the protection scope of the present application.

The invention claimed is:

1. A processor platform, wherein the processor platform comprises one or more processors;

any one of the one or more processors has at least one ultra-path interconnecting port;

the ultra-path interconnecting ports of different instances of the one or more processors correspond one to one;

the ultra-path interconnecting ports of different instances of the one or more processors are connected correspondingly; and the one or more processors include at least one port expanding processor, and the port expanding processor has an expansible data port;

in response to the processor platform comprising at least two processors, the processor platform further comprises one or more expansible Open Computer Project (OCP) links;

each of the one or more expansible OCP links comprises a first processor, a first connector and a second connector;

the first connector has a first first-connector port set and a second first-connector port set, and the second connector has a second-connector port set;
the first processor has a first first-processor port set;
the first first-processor port set corresponds to the first first-connector port set;
the ports in the first first-processor port set are connected correspondingly to the ports in the first first-connector port set; and
the ports in the second first-connector port set are connected correspondingly to the ports in the second-connector port set;
wherein the processor platform further comprises a third connector, and the third connector has a third-connector port set;
the first processor further has a second first-processor port set;
port serial-numbers of channels in the third-connector port set correspond to the port serial-numbers of the channels in the second-connector port set, and port serial-numbers of channels in the second first-processor port set correspond to the port serial-numbers of the channels in the third-connector port set;
the ports in the second-connector port set are connected correspondingly to the ports in the third-connector port set according to the port serial-numbers of the channels; and
the ports in the third-connector port set are connected correspondingly to the ports in the second first-processor port set according to the port serial-numbers of the channels;
wherein the processor platform further comprises a second processor and a fourth connector;
the second processor has a second second-processor port set;
the fourth connector has a fourth-connector port set;
port serial-numbers of channels in the fourth-connector port set correspond to the port serial-numbers of the channels in the second-connector port set, and port serial-numbers of channels in the second second-processor port set correspond to the port serial-numbers of the channels in the fourth-connector port set;
the ports in the second-connector port set are connected correspondingly to the ports in the fourth-connector port set according to the port serial-numbers of the channels, to replace the ports in the second-connector port set to be connected correspondingly to the ports in the third-connector port set; and
the ports in the fourth-connector port set are connected correspondingly to the ports in the second second-processor port set according to the port serial-numbers of the channels.

2. The processor platform according to claim 1, wherein the processor platform further comprises a complex programmable logic device;
the complex programmable logic device has a first complex-programmable-logic-device port and a second complex-programmable-logic-device port;
the second connector further has a first second-connector port and a second second-connector port;
the first second-connector port is connected to the first complex-programmable-logic-device port, to indicate whether the second connector is connected to the third connector or the fourth connector; and
the second second-connector port is connected to the second complex-programmable-logic-device port, to indicate that the second connector is connected to the third connector or that the second connector is connected to the fourth connector.

3. The processor platform according to claim 1, wherein the expansible data port has a plurality of Peripheral Component Interconnect Express (PCIe) channel pairs;
the PCIe channel pairs of a first quantity are connected to a corresponding port of a baseboard management controller;
the PCIe channel pairs of a second quantity are connected to a Universal Serial Bus (USB) interface; and
the PCIe channel pairs of a third quantity are connected to a Serial Advanced Technology Attachment (SATA) interface.

4. The processor platform according to claim 3, wherein a link connecting the PCIe channel pairs of the second quantity and the USB interface comprises a USB controller; and
the PCIe channel pairs of the second quantity are connected to the USB interface by the USB controller.

5. The processor platform according to claim 4, wherein the USB interface comprises at least one of an SCM (single chip microcomputer) USB interface and an MB USB interface.

6. The processor platform according to claim 4, wherein the USB interface is a USB2.0 interface and/or a USB3.0 interface.

7. The processor platform according to claim 3, wherein a link connecting the PCIe channel pairs of the third quantity and the SATA interface comprises an SATA converter; and
the PCIe channel pairs of the third quantity are connected to the SATA interface by the SATA converter.

8. The processor platform according to claim 3, wherein the port expanding processor further comprises a plurality of first transmitting ports; and
each of the first transmitting ports comprises 4 instances of the PCIe channel pairs.

9. The processor platform according to claim 3, wherein the port expanding processor further comprises a second transmitting port; and
the second transmitting port comprises 8 instances of the PCIe channel pairs.

10. The processor platform according to claim 2, wherein the first second-connector port is configured for transmitting a position signal;
the second second-connector port is configured for transmitting a type signal;
the first complex-programmable-logic-device port is configured for receiving the position signal; and
the second complex-programmable-logic-device port is configured for receiving the type signal.

11. The processor platform according to claim 10, wherein in response to the second connector being connected to the third connector or the fourth connector, the position signal is a low level; and
in response to the third connector being connected to the second connector, the type signal is a high level.

12. The processor platform according to claim 1, wherein the port expanding processor is a processor that is not integrated with a south-bridge module.

13. The processor platform according to claim 1, wherein the ultra-path interconnecting ports are configured for transmitting communication data among the processors.

14. The processor platform according to claim 1, wherein the expansible OCP link has a single-port Single-Host x8 interface.

15. A circuit board, wherein the circuit board comprises a processor platform;

wherein the processor platform comprises one or more processors;

any one of the one or more processors has at least one ultra-path interconnecting port;

the ultra-path interconnecting ports of different instances of the one or more processors correspond one to one;

the ultra-path interconnecting ports of different instances of the one or more processors are connected correspondingly; and the one or more processors include at least one port expanding processor, and the port expanding processor has an expansible data port;

in response to the processor platform comprising at least two processors, the processor platform further comprises one or more expansible Open Computer Project (OCP) links;

each of the one or more expansible OCP links comprises a first processor, a first connector and a second connector;

the first connector has a first first-connector port set and a second first-connector port set, and the second connector has a second-connector port set;

the first processor has a first first-processor port set;

the first first-processor port set corresponds to the first first-connector port set;

the ports in the first first-processor port set are connected correspondingly to the ports in the first first-connector port set; and the ports in the second first-connector port set are connected correspondingly to the ports in the second-connector port set;

wherein the processor platform further comprises a third connector, and the third connector has a third-connector port set;

the first processor further has a second first-processor port set;

port serial-numbers of channels in the third-connector port set correspond to the port serial-numbers of the channels in the second-connector port set, and port serial-numbers of channels in the second first-processor port set correspond to the port serial-numbers of the channels in the third-connector port set;

the ports in the second-connector port set are connected correspondingly to the ports in the third-connector port set according to the port serial-numbers of the channels; and the ports in the third-connector port set are connected correspondingly to the ports in the second first-processor port set according to the port serial-numbers of the channels;

wherein the processor platform further comprises a second processor and a fourth connector;

the second processor has a second second-processor port set;

the fourth connector has a fourth-connector port set;

port serial-numbers of channels in the fourth-connector port set correspond to the port serial-numbers of the channels in the second-connector port set, and port serial-numbers of channels in the second second-processor port set correspond to the port serial-numbers of the channels in the fourth-connector port set;

the ports in the second-connector port set are connected correspondingly to the ports in the fourth-connector port set according to the port serial-numbers of the channels, to replace the ports in the second-connector port set to be connected correspondingly to the ports in the third-connector port set; and the ports in the fourth-connector port set are connected correspondingly to the ports in the second second-processor port set according to the port serial-numbers of the channels.

16. A server, wherein the server comprises a circuit board, wherein the circuit board comprises a processor platform;

wherein the processor platform comprises one or more processors;

any one of the one or more processors has at least one ultra-path interconnecting port;

the ultra-path interconnecting ports of different instances of the one or more processors correspond one to one;

the ultra-path interconnecting ports of different instances of the one or more processors are connected correspondingly; and the one or more processors include at least one port expanding processor, and the port expanding processor has an expansible data port;

in response to the processor platform comprising at least two processors, the processor platform further comprises one or more expansible Open Computer Project (OCP) links;

each of the one or more expansible OCP links comprises a first processor, a first connector and a second connector;

the first connector has a first first-connector port set and a second first-connector port set, and the second connector has a second-connector port set;

the first processor has a first first-processor port set;

the first first-processor port set corresponds to the first first-connector port set;

the ports in the first first-processor port set are connected correspondingly to the ports in the first first-connector port set; and the ports in the second first-connector port set are connected correspondingly to the ports in the second-connector port set;

wherein the processor platform further comprises a third connector, and the third connector has a third-connector port set;

the first processor further has a second first-processor port set;

port serial-numbers of channels in the third-connector port set correspond to the port serial-numbers of the channels in the second-connector port set, and port serial-numbers of channels in the second first-processor port set correspond to the port serial-numbers of the channels in the third-connector port set;

the ports in the second-connector port set are connected correspondingly to the ports in the third-connector port set according to the port serial-numbers of the channels; and the ports in the third-connector port set are connected correspondingly to the ports in the second first-processor port set according to the port serial-numbers of the channels;

wherein the processor platform further comprises a second processor and a fourth connector;

the second processor has a second second-processor port set;

the fourth connector has a fourth-connector port set;

port serial-numbers of channels in the fourth-connector port set correspond to the port serial-numbers of the channels in the second-connector port set, and port serial-numbers of channels in the second second-processor port set correspond to the port serial-numbers of the channels in the fourth-connector port set;

the ports in the second-connector port set are connected correspondingly to the ports in the fourth-connector port set according to the port serial-numbers of the channels, to replace the ports in the second-connector port set to be connected correspondingly to the ports in the third-connector port set; and the ports in the fourth-connector port set are connected correspondingly to the ports in the second second-processor port set according to the port serial-numbers of the channels.

17. The processor platform according to claim 1, wherein the expansible OCP link has a single-port Single-Host x16 interface.

18. The processor platform according to claim 4, wherein a signal of the USB controller is Renesas UPD720201, and each of the PCIe channel pairs of the second quantity is connected to the USB interface by one Renesas UPD720201 module.

* * * * *